(12) United States Patent
Moon et al.

(10) Patent No.: US 12,059,979 B2
(45) Date of Patent: Aug. 13, 2024

(54) APPARATUS FOR CHANGING POSITIONS OF SEAT FOR VEHICLES

(71) Applicants: Hyundai Motor Company, Seoul (KR); Kia Corporation, Seoul (KR)

(72) Inventors: Hyun Kyu Moon, Gyeonggi-do (KR); Sang Do Park, Gyeonggi-do (KR); Deok Soo Lim, Gyeonggi-do (KR); Tae Jun Kwon, Incheon (KR); Min Seok Kim, Gyeonggi-do (KR); Du Go Jung, Gyeonggi-do (KR); Chan Ho Jung, Gyeonggi-do (KR); Bong Ku Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 330 days.

(21) Appl. No.: 17/743,936

(22) Filed: May 13, 2022

(65) Prior Publication Data
US 2023/0052454 A1    Feb. 16, 2023

(30) Foreign Application Priority Data

Aug. 10, 2021  (KR) .......................... 10-2021-0105317

(51) Int. Cl.
  B60N 2/02      (2006.01)
  B60N 2/90      (2018.01)
(52) U.S. Cl.
  CPC ......... B60N 2/02246 (2023.08); B60N 2/995 (2018.02); *B60N 2/02253* (2023.08); *B60N 2002/924* (2018.02); *B60N 2002/948* (2018.02)
(58) Field of Classification Search
  CPC .............. B60N 2/02246; B60N 2/0224; B60N 2/02253; B60N 2/504; B60N 2/505; B60N 2/01583; B60N 2/995; B60N 2/10; B60N 2/12; B60N 2/16; B60N 2/1665; B60N 2/1695; B60N 2002/924; B60N 2002/929; B60N 2002/933; B60N 2002/948; A47C 9/005; A47B 2200/0096
  (Continued)

(56) References Cited

U.S. PATENT DOCUMENTS 2,598,421 A * 5/1952 John ..................... B60N 2/505
                                                    297/308
7,854,461 B2 * 12/2010 Yamada ................... B60N 2/06
                                                    296/65.13
(Continued)

FOREIGN PATENT DOCUMENTS

CN    206012395 U  *  3/2017
CN    114889550 A  *  8/2022
(Continued)

*Primary Examiner* — Amy R Weisberg
*Assistant Examiner* — Wenwei Zhuo
(74) *Attorney, Agent, or Firm* — Fox Rothschild LLP

(57) ABSTRACT

An apparatus for changing positions of a seat for vehicles includes mechanisms for adjusting the height of the seat for vehicles, adjusting reclining of the seat for vehicles, changing the seat for vehicles into a knee rest posture and changing the seat for vehicles into a relaxed comfort are integrated into one structure. Accordingly, a user selectively implements adjustment of the height of the seat for vehicles, adjustment of reclining of the seat for vehicles, change into the knee rest posture, and change into the relaxed comfort posture, etc., through operation of the switch.

18 Claims, 5 Drawing Sheets

(58) Field of Classification Search
USPC .......... 296/65.05, 65.01, 65.18, 65.13, 68.1,
296/65.02; 297/344.11, 344.15, 344.16,
297/344.14, 423.11, 423.12, 330, 334
See application file for complete search history.

(56) References Cited

U.S. PATENT DOCUMENTS

| | | | | |
|---|---|---|---|---|
| 2011/0260482 | A1* | 10/2011 | Bourgraf | B60N 2/34 296/19 |
| 2014/0049086 | A1* | 2/2014 | Pelletier | A47C 1/0345 297/344.11 |
| 2018/0272896 | A1* | 9/2018 | Park | B60N 2/02246 |
| 2019/0351792 | A1* | 11/2019 | Kaemmerer | B60N 2/22 |
| 2020/0047642 | A1* | 2/2020 | Han | B60N 2/1821 |
| 2022/0314843 | A1* | 10/2022 | Roche | B60N 2/309 |
| 2023/0191974 | A1* | 6/2023 | Kim | B60N 3/063 297/423.19 |
| 2023/0278472 | A1* | 9/2023 | Thomas | B60N 2/427 297/216.1 |

FOREIGN PATENT DOCUMENTS

| | | | | |
|---|---|---|---|---|
| IT | 1217854 B | * | 3/1990 | .............. B60N 2/10 |
| KR | 20010058906 A | * | 7/2001 | |
| WO | WO-2018036538 A1 | * | 3/2018 | |

\* cited by examiner

APPARATUS FOR CHANGING POSITIONS OF SEAT FOR VEHICLES

CROSS-REFERENCE TO RELATED APPLICATION

This application claims under 35 U.S.C. § 119(a) the benefit of priority to Korean Patent Application No. 10-2021-0105317 filed on Aug. 10, 2021, the entire contents of which are incorporated herein by reference.

BACKGROUND

(a) Technical Field

The present disclosure relates to an apparatus for changing positions of a seat for vehicles, and more particularly, to an apparatus for changing positions of a seat for vehicles in which mechanisms for adjusting and changing various positions of the seat for vehicles are integrated into one structure.

(b) Background Art

In general, a seat for vehicles is manufactured to have a structure that basically includes a seat cushion on which a passenger sits, a seat back against which the passenger leans, a headrest which supports the passenger's neck and head, etc., and, in addition, various seat mechanisms implemented to freely change positions of the seat for vehicles to fit the passenger's body type and a situation are applied to the seat for vehicles. The various seat mechanisms include a mechanism for adjusting the height of the seat for vehicles, a mechanism for implementing a relaxed comfort posture, a mechanism for adjusting reclining of the seat back, etc.

However, when the mechanism for adjusting the height of the seat for vehicles, the mechanism for implementing the relaxed comfort posture, the mechanism for adjusting reclining of the seat back, etc. are provided separately, the number of parts for the respective mechanisms is increased excessively, and thus causes problems, increase in man-hour for assembly, increase in production costs, increase in vehicle weight, etc.

The above information disclosed in this section is merely for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art, and it is an object of the present invention to provide an apparatus for changing positions of a seat for vehicles in which adjustment of the height of the seat for vehicles, adjustment of reclining of the seat for vehicles, change into a knee rest posture, change into a relaxed comfort posture, etc. may be performed by one integrated mechanism.

In one aspect, the present invention provides an apparatus for changing positions of a seat for vehicles that may include a movable rail coupled to a stationary rail to be movable forwards and rearwards, a rear support frame mounted on the movable rail by a hinge shaft to be rotatable upwards and downwards, a middle support frame connected integrally to a front end of the rear support frame at a designated angle, a front support frame provided with a lower end connected integrally to a front end of the middle support frame and an upper end hinge-coupled to a seat cushion frame, a connection frame formed integrally with a rear end of the rear support frame and disposed in a width direction, a motor mounted under the rear support frame and connected to the hinge shaft to transmit rotating power thereto, and an electric cylinder configured to connect the connection frame and a seat back frame to each other using hinges to be movable upwards and downwards.

In an exemplary embodiment, a first latch may be mounted on a lower surface of the rear end of the rear support frame, and a first striker engaged with the first latch to lock the first latch may be mounted on an inner surface of a rear end of the movable rail. A first cable configured to unlock the first latch may be provided to connect the first latch and a cable pulling lever mounted under the seat cushion frame to each other.

In addition, a second latch may be mounted on a lower surface of the front end of the middle support frame, and a second striker engaged with the second latch to lock the second latch may be mounted on an inner surface of a front end of the movable rail. A second cable configured to unlock the second latch may be provided to connect the second latch and the cable pulling lever mounted under the seat cushion frame to each other.

A cylinder body of the electric cylinder may be hinge-coupled to the connection frame, and a piston rod provided in the electric cylinder to be movable upwards and downwards may be hinge-coupled to the seat back frame. In addition, armrest frames may be provided between side parts of the seat back frame and the seat cushion frame.

Further, a leg rest frame configured to extend to be inclined downwards towards a region in front of the seat cushion frame may be formed integrally with a front end of each of the armrest frames, and a leg rest pad used also as a knee rest may be mounted on the leg rest frames. A knee support passage configured such that passenger's legs are inserted thereinto to stretch back may be formed between a rear end of the leg rest pad and a front end of the seat cushion frame.

In an exemplary embodiment, a switch including an assembly of a plurality of buttons may be mounted on one of the armrest frames to selectively perform one of return of a basic posture of the seat for vehicles, adjustment of the height of the seat for vehicles, change of the seat for vehicles into a relaxed comfort posture and change of the seat for vehicles into a knee rest posture. When the switch is operated, a controller may a current signal for implementing one of return of the basic posture of the seat for vehicles, adjustment of the height of the seat for vehicles, change of the seat for vehicles into the relaxed comfort posture and change of the seat for vehicles into the knee rest posture to the electric cylinder and the motor.

Other aspects and preferred embodiments of the invention are discussed infra.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
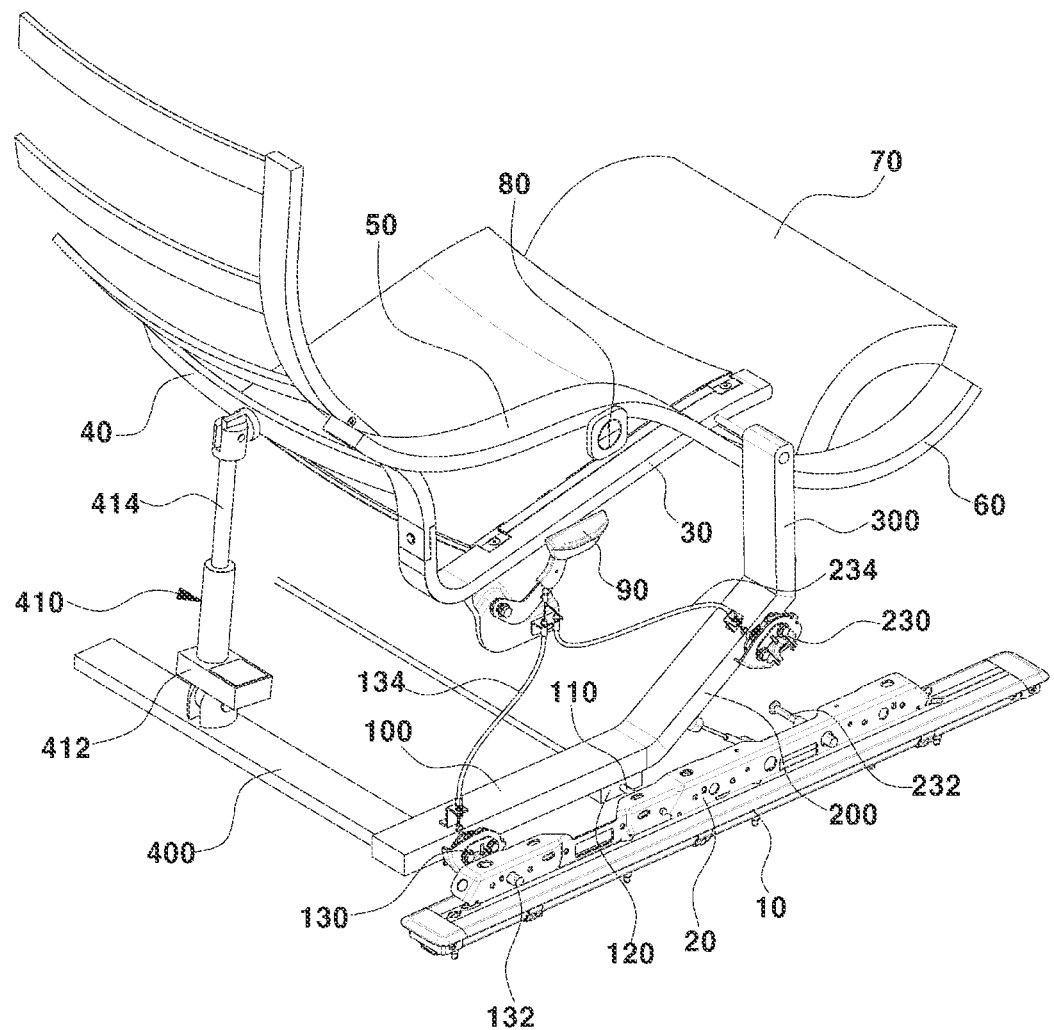
FIG. 1 is a perspective view illustrating an apparatus for changing positions of a seat for vehicles according to the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes, will be determined in part by the particular intended application and use environment. In the figures, reference numbers refer to the same or equivalent parts of the present invention throughout the several figures of the drawing.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, reference will be made in detail to various embodiments of the present invention, examples of which are illustrated in the accompanying drawings and described below. While the invention will be described in conjunction with exemplary embodiments, it will be understood that present description is not intended to limit the invention to the exemplary embodiments. On the contrary, the invention is intended to cover not only the exemplary embodiments, but also various alternatives, modifications, equivalents and other embodiments, which may be within the spirit and scope of the invention as defined by the appended claims.

FIG. 1 is a perspective view illustrating an apparatus for changing positions of a seat for vehicles according to the present invention. As shown in FIG. 1, a stationary rail 10 may be mounted on an indoor floor panel (not shown) of a vehicle, and a movable rail 20 may be coupled to the stationary rail 10 to be movable forwards and rearwards. A rear support frame 100 may be mounted on the movable rail 20 by a hinge shaft 110 to be rotatable upwards and downwards.

In particular, in the state in which the support frame 100 is disposed inside the movable rail 20 parallel to the movable rail 20, the hinge shaft 110 disposed in the width direction of the vehicle is fixed to the front end of the rear support frame 100 and the outer end of the hinge shaft 110 is inserted into the movable rail 20 to be rotatable, and thereby, the rear end of the rear support frame 100 is rotatable upwards and rearwards about the hinge shaft 110.

A motor 120 may be mounted under the lower surface of the front end of the rear support frame 100, and the output shaft of the motor 120 may be connected to the hinge shaft 110 by a gear box (not shown) to transmit rotating power thereto. For example, in the state in which the hinge shaft 110 is fixed while passing through the gear box of the motor 120, a driving gear (not shown) connected to the output shaft of the motor 120 in the gear box and a driven gear (not shown) formed on the hinge shaft 110 are engaged with each other, and thereby, when the motor 120 is driven, the rotating power of the driving gear may be transmitted to the driven gear to rotate the hinge shaft 110, and the rear end of the rear support frame 100 may be rotated upwards or rearwards at a designated angle about the hinge shaft 110.

A middle support frame 200 may be connected integrally to the front end of the rear support frame 100 at a designated angle. Preferably, the rear support frame 100 and the middle support frame 200 may be connected to form a V-shape, as seen from the side, and thus, when the rear support frame 100 is disposed horizontally, the middle support frame 200 may be disposed to be inclined upwards towards the front part of the vehicle, and, when the middle support frame 200 is disposed horizontally, the rear support frame 100 may be disposed to be inclined upwards towards the rear part of the vehicle.

In particular, when the rear end of the rear support frame 100 is rotated downwards due to rotation of the motor 120 in one direction and thus the rear support frame 100 is disposed horizontally, the middle support frame 200 is disposed to be inclined upwards towards the front part of the vehicle, and, on the other hand, when the rear end of the rear support frame 100 is rotated upwards due to rotation of the motor 120 in the other direction and thus the rear support frame 100 is disposed to be inclined upwards towards the rear part of the vehicle, the middle support frame 200 is disposed horizontally.

The lower end of a front support frame 300 may be connected integrally to the front end of the middle support frame 200, and the upper end of the front support frame 300 may be hinge-coupled to one side part (e.g., a first side part) of a seat cushion frame 30. Thereby, the seat cushion frame 30 is supported by the front support frame 300. A connection frame 400 disposed in the width direction of the vehicle is formed integrally with the rear end of the rear support frame 100. Particularly, an electric cylinder 410 is configured to connect the connection frame 400 and a seat back frame 40 to each other using hinges to be movable upwards and downwards (e.g., vertically).

Preferably, the lower surface of a cylinder body 412 of the electric cylinder 410 may be hinge-coupled to the connection frame 400, and a piston rod 414 provided in the electric cylinder 410 to be movable upwards and downwards may be hinge-coupled to a designated position of the rear surface of the seat back frame 40. For example, a lead screw configured to idle due to an actuator and a nut structure moved forwards and rearwards along the lead screw are installed in the electric cylinder 410, and the piston rod 414 is connected to the nut structure to be movable upwards and downwards.

To fix the rear support frame 100 when the rear support frame 100 is disposed horizontally, a first latch 130 may be mounted on the lower surface of the rear end of the rear support frame 100, and a first striker 132 engaged with the first latch 130 to lock the first latch 130 is mounted on the inner surface of the rear end of the movable rail 20. Preferably, to unlock the first latch 130, a cable pulling lever 90 is mounted under the seat cushion frame 30, and a first cable 134 is configured to connect the first latch 130 and the cable pulling lever 90.

Further, to fix the middle support frame 200 when the middle support frame 200 is disposed horizontally, a second latch 230 may be mounted on the lower surface of the front end of the middle support frame 200, and a second striker 232 engaged with the second latch 230 to lock the second latch 230 may be mounted on the inner surface of the front end of the movable rail 20. Preferably, to unlock the second latch 230, a second cable 234 is configured to connect the second latch 230 and the cable pulling lever 90.

Therefore, when the cable pulling lever 90 is pulled, the first cable 134 and the second cable 234 are pulled, and thereby, the first latch 130 and the second latch 230 may be simultaneously unlocked. For reference, known latches, which are mounted on a vehicle door or the like to be locked with strikers, may be used as the first latch 130 and the second latch 230, and the locking structure and principle of the latches are already known and thus a detailed description thereof will thus be omitted.

Armrest frames 50 on which the passenger may put his/her arms are provided between the side parts of the seat back frame 40 and the seat cushion frame 30. Particularly, a leg rest frame 60 configured to extend to be inclined downwards towards a region in front of the seat cushion frame 30 is formed integrally with the front end of each of the armrest frames 50, and a leg rest pad 70 used also as a knee rest is mounted on the leg rest frames 60. Particularly, to implement a knee rest posture, a knee support passage 72 into which the passenger's legs are inserted to stretch back is formed between the rear end of the leg rest pad 70 and the front end of the seat cushion frame 30.

Further, a switch 80 including an assembly of a plurality of buttons is mounted on one of the armrest frames 50 to selectively perform one of return of the basic posture of the seat for vehicles, adjustment of the height of the seat for vehicles, change into the relaxed comfort posture and change into the knee rest posture. When one of the buttons of the switch 80 is operated, a controller (not shown) may be configured to apply a current signal for implementing one of return of the basic posture of the seat for vehicles, adjustment of the height of the seat for vehicles, change into the relaxed comfort posture and change into the knee rest posture to the electric cylinder 410 and the motor 120.

Hereinafter, the respective operating modes of the apparatus having the above-described configuration according to the present invention will be described.

Basic Posture of Seat for Vehicles

Figure 2:
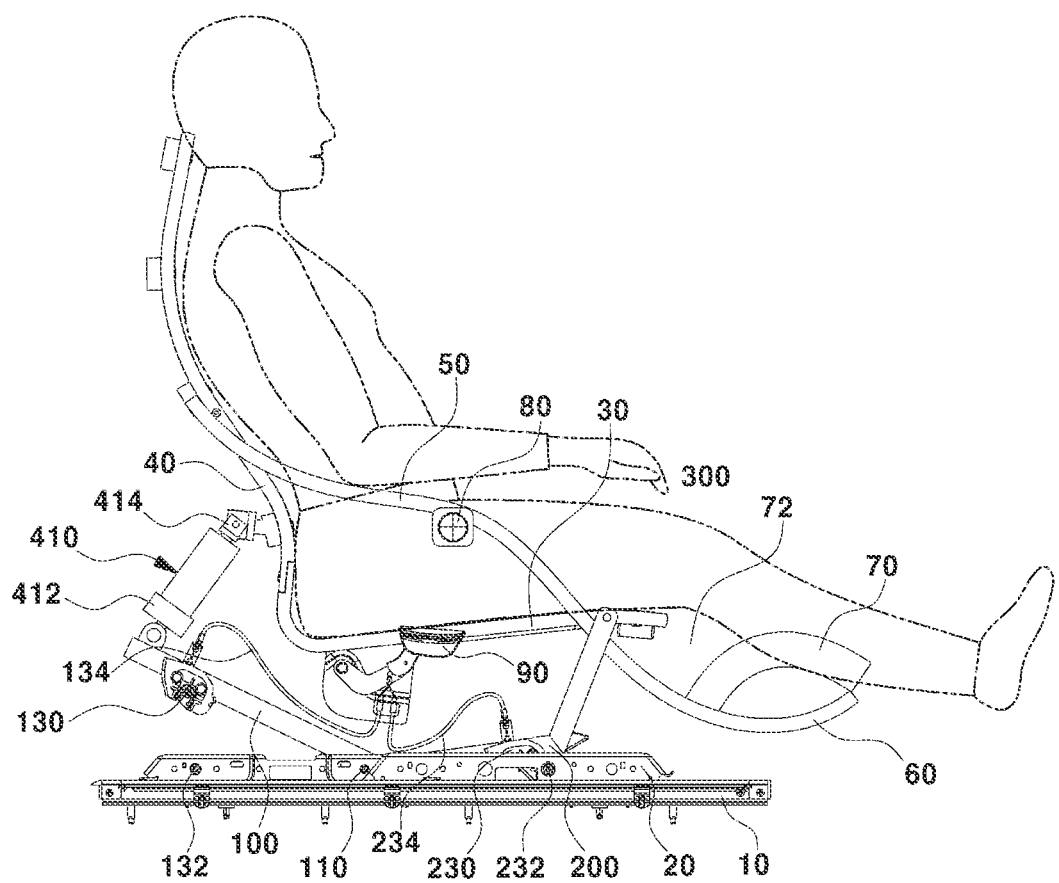
FIG. 2 is a side view illustrating the basic posture of the seat for vehicles assumed by the apparatus according to the present invention.

FIG. 2 is a side view illustrating the basic posture of the seat for vehicles assumed by the apparatus according to the present invention. The basic posture of the seat for vehicles is referred to as the posture of the seat for vehicles on which a passenger may sit with a proper posture.

To implement the basic posture of the seat for vehicles, the first latch 130 mounted on the rear support frame 100 is separated from the first striker 132 mounted on the movable rail 20, and the second latch 230 mounted on the middle support frame 200 is locked with the second striker 232 mounted on the movable rail 20. Therefore, the middle support frame 200 is disposed horizontally in the forward and rearward directions, and the rear support frame 100 is disposed to be inclined upwards towards the rear part of the vehicle.

Further, the piston rod 414 is drawn into the electric cylinder 410 and is thus moved maximally downwards. Therefore, the passenger may stretch his/her legs and put his/her legs on the leg rest pad 70 when sitting on the seat for vehicles, and may thus sit in a comfortable position.

Adjustment of Height of Seat for Vehicles

Figure 3:
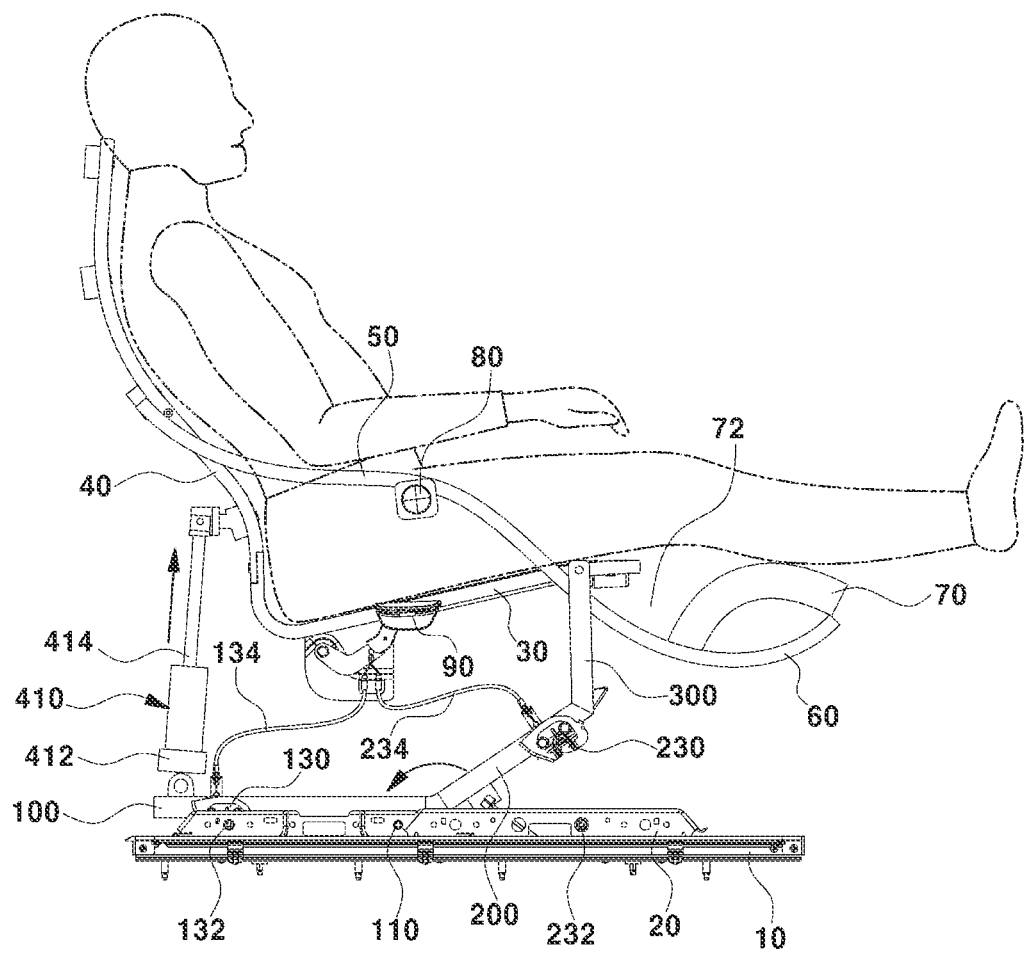
FIG. 3 is a side view illustrating a seat height adjustment operation performed by the apparatus according to the present invention.

FIG. 3 is a side view illustrating a seat height adjustment operation performed by the apparatus according to the present invention. When a button for adjusting the height of the seat for vehicles among the buttons of the switch 80 is pressed, a current for raising the height of the seat for vehicles is applied to the electric cylinder 410 and the motor 120.

Further, the first latch 130 and the second latch 230 are simultaneously unlocked by pulling the cable pulling lever 90. Then, when the motor 120 is rotated in one direction (e.g., a first direction), the rear end of the rear support frame 100 is rotated downwards and thus the rear support frame 100 is disposed horizontally, and the middle support frame 200 is disposed to be inclined upwards towards the front part of the vehicle.

When the middle support frame 200 is disposed to be inclined upwards towards the front part of the vehicle, the front support frame 300 is raised upwards, and thus pushes the seat cushion frame 30 upwards. In particular, the second latch 230 mounted on the middle support frame 200 is separated from the second striker 232 mounted on the movable rail 20, and subsequently, when force applied to the cable pulling lever 90 is released, the first latch 130 mounted on the rear support frame 100 is locked with the first striker 132 mounted on the movable rail 20.

Further, the piston rod 414 of the electric cylinder 410 is moved upwards together with rotation of the motor 120 in the corresponding direction and thus pushes the seat back frame 40 upwards, and thereby, the seat back frame 40 is raised upwards together with the seat cushion frame 30. Accordingly, the height of the seat may be easily adjusted by raising the seat cushion frame 30 and the seat back frame 40 upwards.

Change into Relaxed Comfort Posture

Figure 4:
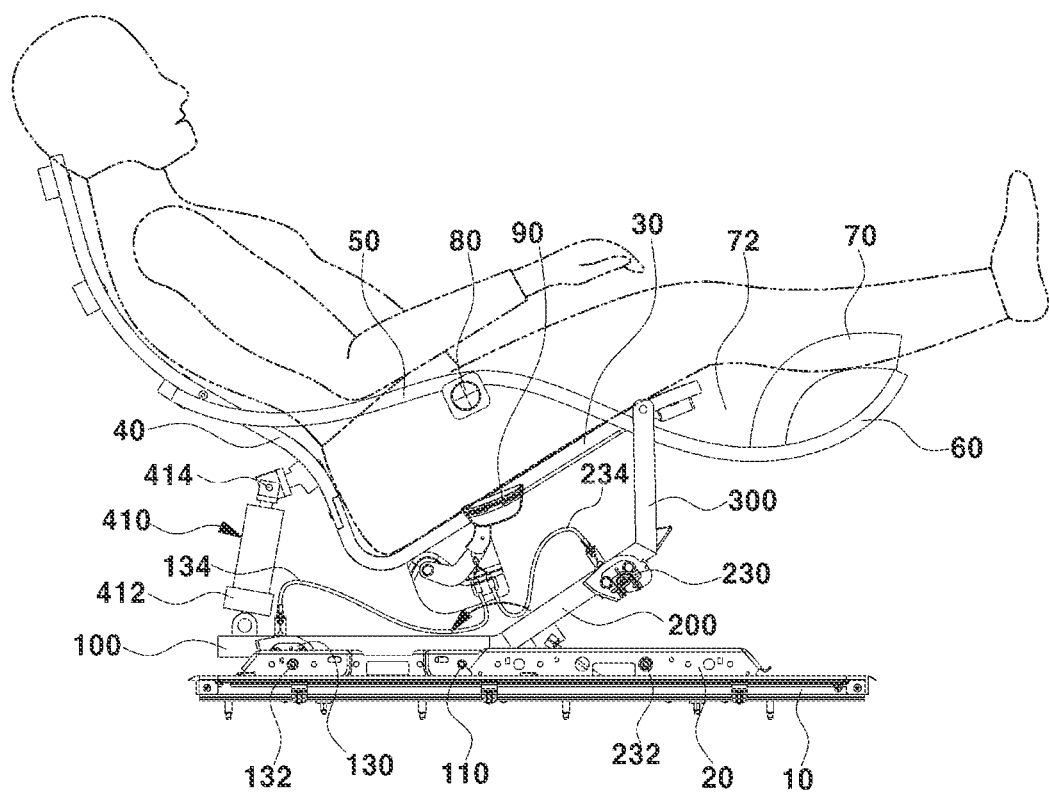
FIG. 4 is a side view illustrating a relaxed comfort posture change operation performed by the apparatus according to the present invention.

FIG. 4 is a side view illustrating a relaxed comfort posture change operation performed by the apparatus according to the present invention. In the above-described state in which the seat for vehicles is in the basic posture, when a button for changing the seat for vehicles into the relaxed comfort posture among the buttons of the switch 80 is pressed or otherwise engaged, a current for changing the seat for vehicles into the relaxed comfort posture is applied to the motor 120.

Further, the first latch 130 and the second latch 230 are simultaneously unlocked by pulling the cable pulling lever 90. Then, when the motor 120 is rotated in one direction, the rear end of the rear support frame 100 is rotated downwards and thus the rear support frame 100 is disposed horizontally, and the middle support frame 200 is disposed to be inclined upwards towards the front part of the vehicle.

When the middle support frame 200 is disposed to be inclined upwards towards the front part of the vehicle, the front support frame 300 is raised upwards, and thus pushes the front end of the seat cushion frame 30 upwards. Simultaneously, when the rear end of the rear support frame 100 is rotated downwards and thus the rear support frame 100 is disposed horizontally, the piston rod 414 is drawn into the electric cylinder 410 and is thus moved maximally downwards, and thereby, the seat back frame 40 is reclined.

In particular, the second latch 230 mounted on the middle support frame 200 is separated from the second striker 232 mounted on the movable rail 20, and subsequently, when force applied to the cable pulling lever 90 is released, the first latch 130 mounted on the rear support frame 100 is locked with the first striker 132 mounted on the movable rail 20. Accordingly, the front end of the seat cushion frame 30 is raised upwards and the seat back frame 40 is reclined simultaneously, thereby being capable of more easily implementing the relaxed comfort posture as if the passenger lies down to rest.

Change into Knee Rest Posture

Figure 5:
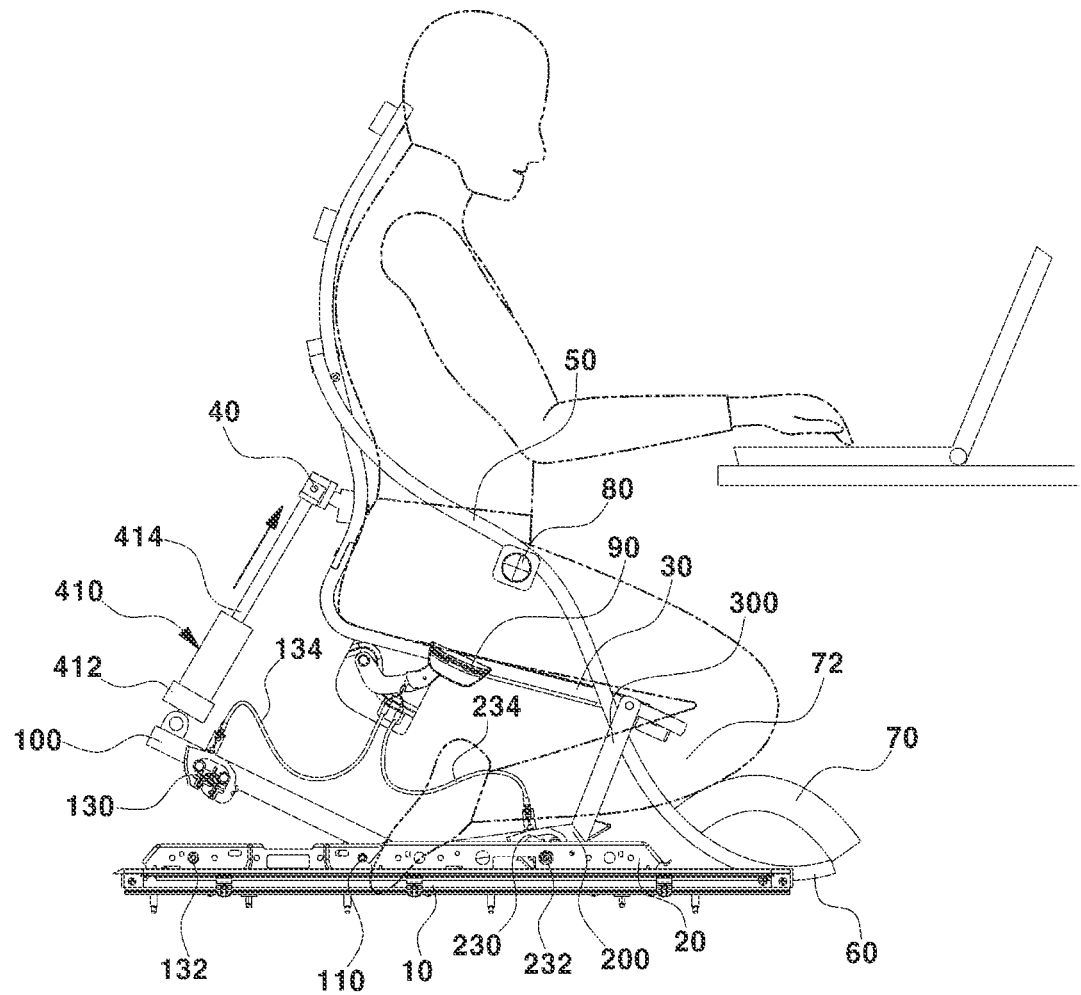
FIG. 5 is a side view illustrating a knee rest posture change operation performed by the apparatus according to the present invention.

FIG. 5 is a side view illustrating a knee rest posture change operation performed by the apparatus according to the present invention. In the above-described state in which the seat for vehicles is in the basic posture, when a button for changing the seat for vehicles into the knee rest posture among the buttons of the switch 80 is pressed or otherwise engaged, a current for changing the seat for vehicles into the knee rest posture is applied to the electric cylinder 140. In particular, the first latch 130 mounted on the rear support frame 100 is separated from the first striker 132 mounted on the movable rail 20, and the second latch 230 mounted on the middle support frame 200 is locked with the second striker 232 mounted on the movable rail 20.

Further, the middle support frame 200 may be disposed horizontally in the forward and rearward directions, and the rear support frame 100 may be disposed to be inclined upwards towards the rear part of the vehicle. Accordingly, the piston rod 414 is drawn out of the electric cylinder 410 and is thus moved maximally upwards and pushes the seat back frame 40 upwards, and simultaneously, the front end of the seat cushion frame 30 is tilted downwards.

At this time, when a passenger inserts his/her legs into the knee support passage 72 formed between the rear end of the leg rest pad 70 and the front end of the seat cushion frame 30 and then stretches his/her legs back, the passenger's knees may be pressed against and supported by the leg rest pad 70 used also the knee rest. Therefore, in the state in which the passenger stretches his/her back and presses his/her knees against the leg rest pad 70 to be supported by the leg rest pad 70, the passenger may do some work using a notebook or the like placed on a table. Accordingly, only the piston rod 414 of the electric cylinder 410 is raised upwards in the basic posture of the seat for vehicles, thereby being capable of more easily implementing the knee rest posture in which the seat back frame 40 is pushed upwards and the front end of the seat cushion frame 30 is tilted downwards.

As is apparent from the above description, an apparatus for changing positions of a seat for vehicles according to the present invention may provide the following effects.

First, the apparatus allows a user to selectively implement adjustment of the height of the seat for vehicles, adjustment of reclining of the seat for vehicles, change into a knee rest posture and change into a relaxed comfort posture, etc., through operation of only a switch, thereby being capable of providing convenience.

Second, the apparatus enables mechanisms for adjusting the height of the seat for vehicles, adjusting reclining of the seat for vehicles, changing the seat for vehicles into the knee rest posture and changing the seat for vehicles into the relaxed comfort to be integrated into one structure, thereby being capable of reducing man-hour for assembly, production costs and vehicle weight.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for changing positions of a seat for vehicles, the apparatus comprising:
   a movable rail coupled to a stationary rail to be movable forwards and rearwards;
   a rear support frame mounted on the movable rail by a hinge shaft to be rotatable upwards and downwards;
   a middle support frame connected integrally to a front end of the rear support frame at a designated angle;
   a front support frame provided with a lower end connected integrally to a front end of the middle support frame, and an upper end hinge-coupled to a seat cushion frame;
   a connection frame formed integrally with a rear end of the rear support frame and disposed in a width direction;
   a motor mounted under the rear support frame and connected to the hinge shaft to transmit rotating power thereto; and
   an electric cylinder configured to connect the connection frame and a seat back frame to each other using hinges to be movable upwards and downwards.

2. The apparatus of claim 1, wherein a first latch is mounted on a lower surface of the rear end of the rear support frame, and a first striker engaged with the first latch to lock the first latch is mounted on an inner surface of a rear end of the movable rail.

3. The apparatus of claim 2, wherein a first cable configured to unlock the first latch is provided to connect the first latch and a cable pulling lever mounted under the seat cushion frame to each other.

4. The apparatus of claim 1, wherein a second latch is mounted on a lower surface of the front end of the middle support frame, and a second striker engaged with the second latch to lock the second latch is mounted on an inner surface of a front end of the movable rail.

5. The apparatus of claim 4, wherein a second cable configured to unlock the second latch connects the second latch and the cable pulling lever mounted under the seat cushion frame to each other.

6. The apparatus of claim 1, wherein a cylinder body of the electric cylinder is hinge-coupled to the connection frame, and a piston rod provided in the electric cylinder to be movable upwards and downwards is hinge-coupled to the seat back frame.

7. The apparatus of claim 1, wherein armrest frames are provided between side parts of the seat back frame and the seat cushion frame.

8. The apparatus of claim 7, wherein a leg rest frame configured to extend to be inclined downwards towards a region in front of the seat cushion frame is formed integrally with a front end of each of the armrest frames, and a leg rest pad used also as a knee rest is mounted on the leg rest frames.

9. The apparatus of claim 8, wherein a knee support passage configured to receive passenger's legs therein is formed between a rear end of the leg rest pad and a front end of the seat cushion frame.

10. The apparatus of claim 7, wherein a switch including an assembly of a plurality of buttons is mounted on one of the armrest frames to selectively perform one of a return of a basic posture of the seat for vehicles, an adjustment of the height of the seat for vehicles, a change of the seat for vehicles into a relaxed comfort posture, and a change of the seat for vehicles into a knee rest posture.

11. The apparatus of claim 10, wherein, when the switch is operated, a controller is configured to apply a current signal for implementing one of the return of the basic posture of the seat for vehicles, the adjustment of the height of the seat for vehicles, the change of the seat for vehicles into the relaxed comfort posture, and the change of the seat for vehicles into the knee rest posture to the electric cylinder and the motor.

12. The apparatus of claim 11, wherein, to implement the basic posture of the seat for vehicles, a piston rod of the electric cylinder is moved maximally downwards, the middle support frame is disposed horizontally in forward and rearward directions, and the rear support frame is disposed to be inclined upwards towards a rear part of a vehicle.

13. The apparatus of claim 12, wherein a first latch mounted on the rear support frame is separated from a first striker mounted on the movable rail, and a second latch mounted on the middle support frame is locked with a second striker mounted on the movable rail.

14. The apparatus of claim 11, wherein, to adjust the height of the seat for vehicles, a piston rod of the electric cylinder is moved upwards together with rotation of the motor in one direction and thus pushes the seat back frame upwards, a second latch mounted on the middle support frame is separated from a second striker mounted on the movable rail, and a first latch mounted on the rear support frame is locked with a first striker mounted on the movable rail.

15. The apparatus of claim 11, wherein, to change the seat for vehicles into the relaxed comfort posture, the rear support frame is disposed horizontally due to rotation of the motor in one direction, the middle support frame is disposed to be inclined upwards towards a front part of a vehicle, the front support frame is raised upwards and thus pushes a front end of the seat cushion frame upwards, and a piston rod is drawn into the electric cylinder and is thus moved maximally downwards, and the seat back frame is reclined.

16. The apparatus of claim 15, wherein a second latch mounted on the middle support frame is separated from a second striker mounted on the movable rail, and a first latch mounted on the rear support frame is locked with a first striker mounted on the movable rail.

17. The apparatus of claim 11, wherein, to change the seat for vehicles to the knee rest posture, the middle support frame is disposed horizontally in forward and rearward directions, the rear support frame is disposed to be inclined upwards towards a rear part of a vehicle, a piston rod of the electric cylinder is moved upwards and pushes the seat back frame upwards, and a front end of the seat cushion frame is tilted downwards.

18. The apparatus of claim 17, wherein a first latch mounted on the rear support frame is separated from a first striker mounted on the movable rail, and a second latch mounted on the middle support frame is locked with a second striker mounted on the movable rail.

* * * * *